(12) United States Patent
Tanizaki et al.

(10) Patent No.: US 7,930,100 B2
(45) Date of Patent: Apr. 19, 2011

(54) COMPUTER READABLE MEDIUM STORING A MAP DATA UPDATING PROGRAM AND MAP DATA UPDATING TERMINAL

(75) Inventors: Masaaki Tanizaki, Arlington Heights, IL (US); Toshifumi Arai, Yokohama (JP); Kenji Naka, Tokyo (JP); Michio Morioka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 800 days.

(21) Appl. No.: 11/701,469

(22) Filed: Feb. 2, 2007

(65) Prior Publication Data
US 2007/0213929 A1 Sep. 13, 2007

(30) Foreign Application Priority Data
Mar. 10, 2006 (JP) ................................. 2006-065029

(51) Int. Cl.
*G01C 21/30* (2006.01)
(52) U.S. Cl. ........ 701/208; 701/200; 701/207; 701/213; 701/214; 340/990; 340/995.12
(58) Field of Classification Search ................... 701/208
See application file for complete search history.

(56) References Cited

U.S. PATENT DOCUMENTS
6,704,649 B2 3/2004 Miyahara
2003/0220735 A1* 11/2003 Nimura .......................... 701/208
2007/0282524 A1* 12/2007 Tanizaki et al. ............... 701/208

FOREIGN PATENT DOCUMENTS
| JP | 2003-44992 | 7/2001 |
| JP | 2004-077254 | 8/2002 |
| JP | 2004-178248 | 11/2002 |
| JP | 2005-122003 | 10/2003 |
| WO | WO 2006/011278 A1 | 2/2006 |

* cited by examiner

*Primary Examiner* — Mark Hellner
*Assistant Examiner* — Redhwan Mawari
(74) *Attorney, Agent, or Firm* — Stites & Harbison PLLC; Juan Carlos A. Marquez, Esq.

(57) ABSTRACT

In order to quickly update map data in region units without generation of contradiction to adjacent non-updated regions after the updating, under map data updating, time and date of updating of update region of a terminal is obtained with designation of a region as the update object used as a trigger, a mesh ID on the external boundary of the partial update region is obtained, and the differential updating data ID of the updated differential updating data is also obtained from the terminal. The partial updating data and differential updating data required for updating of the designated region of the terminal are selected from the information obtained above and these selected data are applied to the map data of terminal. When updating is conducted using the partial updating data and differential updating data, the time and date of updating of the relevant partial update region ID are changed and the differential updating data ID is registered to the differential management data.

5 Claims, 16 Drawing Sheets

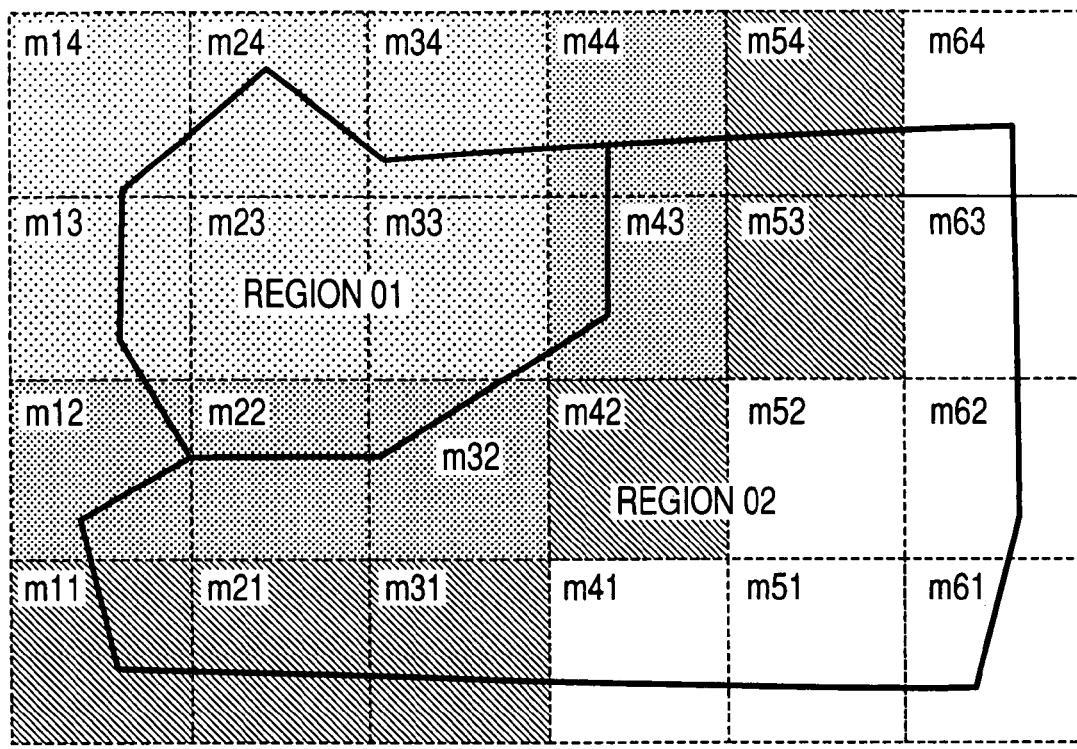

DIFFERENTIAL-UPDATE MANAGEMENT DATA TL — 1033

| DIFFERENTIAL UPDATE DATA ID | UPDATING TIME | MESH ID ARRAY | DEPENDING UPDATING DATA ID | PATH FOR DIFFERENTIAL UPDATE DATA |
|---|---|---|---|---|
| 001 | t001 | m1,m2... |  | file01 |
| 002 | t002 | m1,m5... | 001 | file02 |
| 003 | t002 | m1,m6... | 001 | file04 |
| 004 | t003 | m8... |  | file05 |
| ⋮ | ⋮ | ⋮ | ⋮ | ⋮ |

FIG. 7A
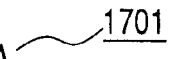
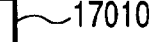
FIG. 7B
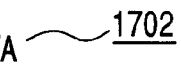
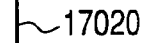

FIG. 10

PARTIAL UPDATE MANAGEMENT DATA TL ~2032

| PARTIAL UPDATING REGION ID (20321) | UPDATING TIME (20322) |
|---|---|
| 01 | t005 |
| 02 | t010 |
| ⋮ | ⋮ |

DIFFERENTIAL-UPDATE MANAGEMENT DATA TL ~2033

| DIFFERENTIAL UPDATE DATA ID (20331) | UPDATING TIME (20332) | MESH ID ARRAY (20333) | DEPENDING UPDATING DATA ID (20334) |
|---|---|---|---|
| 001 | t001 | m1,m2... | |
| 002 | t002 | m1,m5... | 001 |
| 003 | t002 | m2,m6... | 001 |
| 004 | t003 | m8... | |
| ⋮ | ⋮ | ⋮ | ⋮ |

Figure 18:
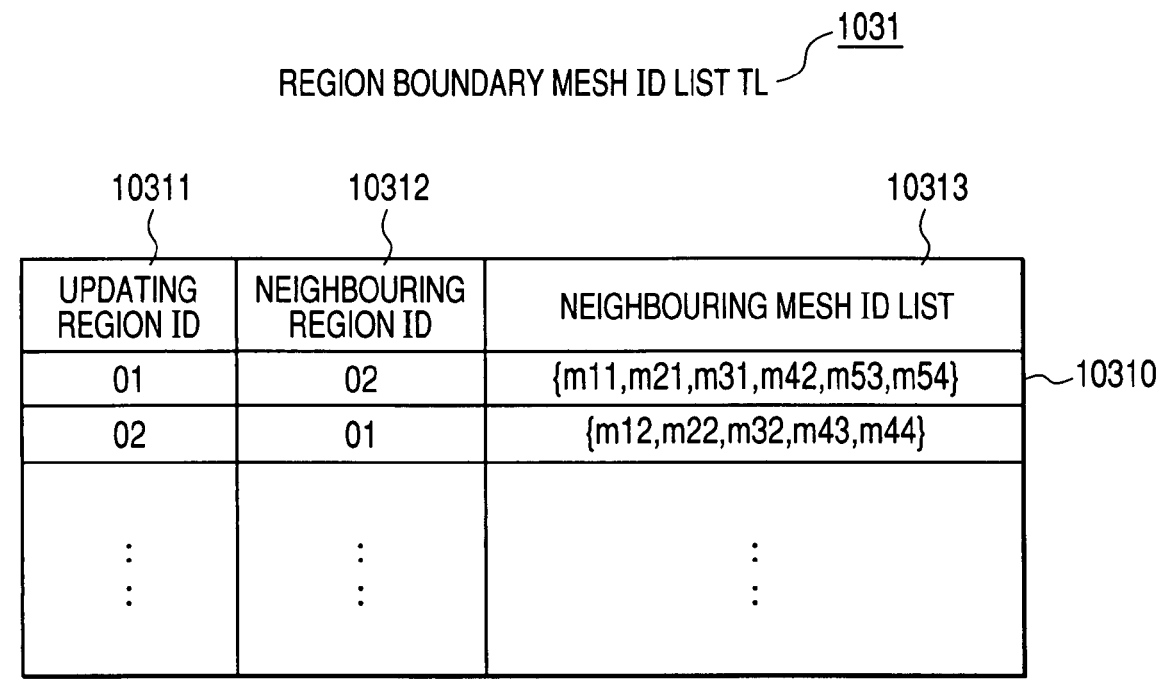

REGION BOUNDARY MESH ID LIST TL — 1031

| UPDATING REGION ID (10311) | NEIGHBOURING REGION ID (10312) | NEIGHBOURING MESH ID LIST (10313) |
|---|---|---|
| 01 | 02 | {m11,m21,m31,m42,m53,m54} |
| 02 | 01 | {m12,m22,m32,m43,m44} |
| ⋮ | ⋮ | ⋮ |

10310

COMPUTER READABLE MEDIUM STORING A MAP DATA UPDATING PROGRAM AND MAP DATA UPDATING TERMINAL

CLAIM OF PRIORITY

The present application claims priority from Japanese application JP 2006-065029 filed on Mar. 10, 2006, the content of which is hereby incorporated by reference into this application.

FIELD OF THE INVENTION

The present invention relates to a technology to update map data.

BACKGROUND OF THE INVENTION

JP-A No. 2003-044992 and JP-A No. 2004-077254 disclose the technology to distribute map data in mesh units to communication terminals such as navigation apparatus from a server and to display the latest state by replacing the relevant mesh if updating is conducted.

Moreover, the technology for management of the process until the updated road is connected to the existing road as a group of data has also been proposed (for example, JP-A No. 2004-178248).

SUMMARY OF THE INVENTION

At a terminal such as a navigation apparatus installing map data, it is highly requested to update map data to the latest one from time to time in order to realize search of facilities located at the destination area and navigation to such destination area in accordance with the actual world.

In the case where the existing technique for conducting management in mesh units is used to satisfy the request explained above, when the correcting section of road exists, for example, on the adjacent two meshes, continuity of the relevant road is lost, if distribution timings of adjacent two meshes are different. Therefore, such technique is likely disabled in application into navigation processes such as search of route and route guidance.

Moreover, the technique explained above for sequentially reflecting contents of update to the roads in the map data in units of the roads changed requires a large amount of processes for execution of the update process. Particularly, a mobile terminal is often surrounded by hardware environment with less amount of resources and therefore a longer processing time is required in the system for sequentially executing a large amount of update processes in units of figures changed.

The present invention has been proposed, considering the background explained above and therefore it is an object of the present invention to provide a map data update technique for quickly updating map data of each region and preventing discontinuity of road connecting information at the boundary to adjacent non-update regions.

The representative inventions disclosed in this specification for solving the problems explained above are as follows. Upon setting of the update region, map data in units of the predetermined regions under the management corresponding to such update region is searched from the map data under the management in units of the predetermined regions. Thereafter, differential updating data of feature in the adjacent mesh of the update region corresponding to the update region and differential updating data of feature affected by update based on the differential updating data are also searched. In addition, a computer readable medium storing a map data updating program and apparatus executes updating of map data of the update region using the map data in units of the predetermined regions searched and differential updating data in units of features searched.

According to an embodiment of the present invention, only the predetermined region can be updated to the latest state within a short period of time and matching with the adjacent non-update region can be maintained.

Therefore, updating of map data can be realized, for example, in units of prefectures in Japan and procedure and cost of map data updating for remote regions not including chance of running can be eliminated. Moreover, in order to maintain the relationship in connection of roads of the adjacent prefectures, basic functions of the navigation system such as search and guidance can be used without any troubles. With the advantage mentioned above, the connecting state of roads between the designated regions within a country and the adjacent countries can always be maintained to the latest state in view of improving convenience of users not only in Japan but also in plural countries, for example, in Europe where timings for preparations of map are not unified.

BRIEF DESCRIPTION OF THE DRAWINGS

FIG. 3 is a schematic diagram showing concepts of region and mesh;

FIG. 4 is a schematic diagram showing registered contents of partial update management data TL 1032;

FIG. 7A is a diagram for explaining a structure 1701 of partial updating data file; and FIG. 7B is a diagram for explaining a structure 1702 of differential updating data file;

FIG. 10 is a schematic diagram showing registered contents of partial update management data TL 2032;

FIG. 11 is a schematic diagram showing registered contents of differential update management data TL 2033;

FIG. 18 is a schematic diagram showing registered contents of region boundary mesh ID column TL 1031.

DETAILED DESCRIPTION OF THE PREFERRED EMBODIMENTS

The preferred embodiments of the present invention will be explained below.

Figure 1:
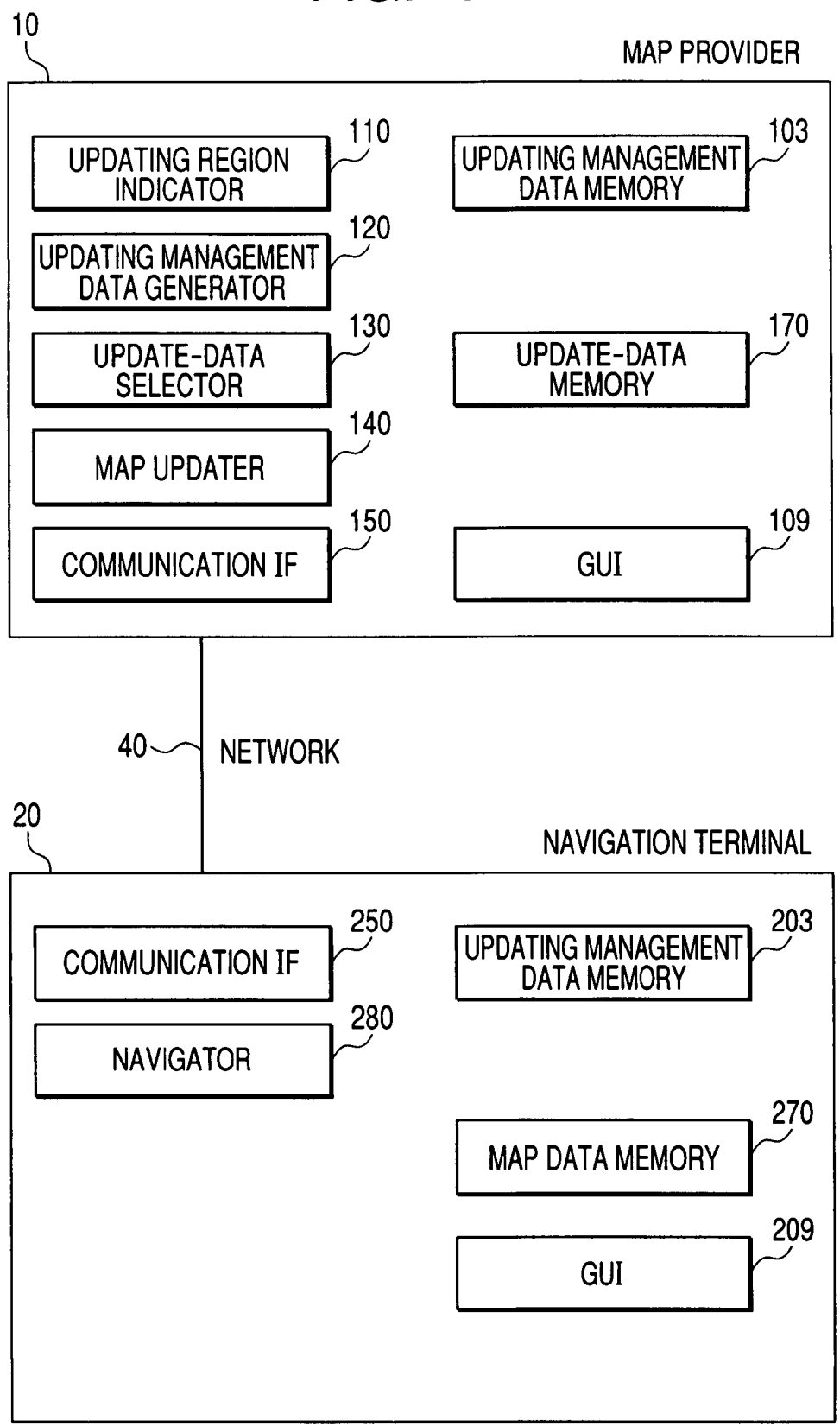
FIG. 1 is a schematic diagram showing a map data update system to which an embodiment of the present invention is applied.

FIG. 1 is a schematic diagram of a map data update system to which an embodiment of the present invention is applied. As shown in FIG. 1, the map data update system of this embodiment includes a map provider 10 and a navigation terminal 20 which are connected with a wired or wireless network 40. The network 40 may be connected only for updating map information of the navigation terminal 20.

The map provider 10 transmits data for updating map information to the navigation terminal 20. As is shown in the figure, the map provider 10 further includes an updating region indicator 110, an updating management data generator 120, an update-data selector 130, a map updater 140, a communication IF 150 for connecting the map provider 10 and a terminal via the network 40, an update management data memory 103, an update-data memory 170, and GUI (Graphical User Interface) 109 for displaying information to users and accepting indication from users.

The update-data memory 170 stores map update data (called partial updating data) in region units and map update data (called differential updating data) in units of features which can be obtained by dividing the map into plural regions in the predetermined unit.

Here, update data is used for updating a partial region of map and content thereof is the map data of the any region. The region may also be considered, for example, as administrative districts such as prefectures, cities, towns or villages. Partial updating of map data can be realized by rewriting a partial region of this map data into the partial updating data of the relevant region.

Moreover, the differential updating data is used when a map article is updated and content thereof is differential data from the map article before the update. Differential updating of map data can be executed by deleting, adding, and correcting the map article in accordance with content of the differential updating data.

Figure 2:
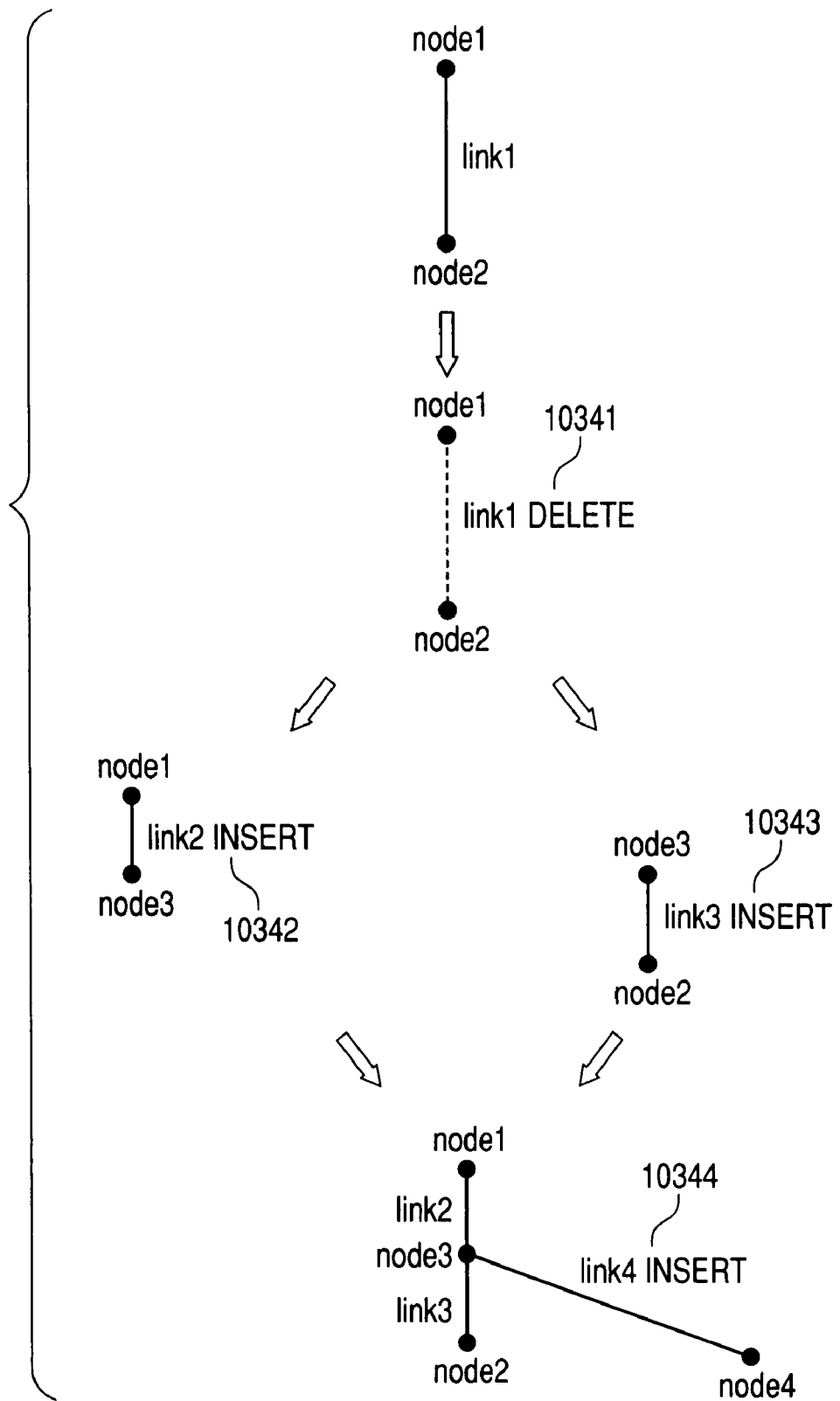
FIG. 2 is a diagram for explaining differential updating data.

FIG. 2 is a diagram for explaining differential updating data. As shown in FIG. 2, a straight road can be altered to the roads of shape T by deleting (10341) a Link 1 forming the straight road, adding (10342) a Link 2 where one node is defined as one node 1 of the Link 1 and the other node is defined as node 3 connected to the roads of shape T, adding (10343) a Link 3 where one node is defined as the other node 2 of the Link 1 and the other node is defined as node 3 connected to the roads of shape T, and finally adding 344) a Link 4 where one node is defined as node 3. The data indicating a series of addition and deletion is used as the differential updating data.

FIG. 3 is a diagram for explaining the partial updating data. A map data is generally divided in its plane into the regions in the shape of lattice called meshes as shown in FIG. 3 and the map data is placed under the management in mesh units. Plural links and nodes indicating roads, for example, are stored in the map data in mesh units. Moreover, regions such as administrative districts exist overlapping plural meshes such as the region 01, region 02, etc. in FIG. 3. Therefore, in the case where map data is placed under the management in region units, the management method is employed in which each mesh is assigned to one region not overlapping the regions. In this example, assignment is conducted as follows.

Meshes forming region 01: {m12, m22, m32, m13, m23, m33, m43, m13, m24, m34, m44}

Meshes forming region 02: {m11, m21, m31, m41, m51, m61, m42, m52, m62, m53, m63, m54, m64}

Here, assignment is conducted without overlap of meshes among the regions like this embodiment, but the meshes included in the region may be placed under the management conforming to a rule corresponding to such region. Accordingly, correspondence between regions and meshes can be more simplified. On the other hand, according to this embodiment, overlap of meshes can be eliminated among the regions and the meshes as the update object can be placed under the uniform management. Such uniform management results in a merit that the processing time can be shortened. That is, when meshes are registered overlapping plural regions, it is required to individually execute update process for the mesh registered in each region at the time of update. Moreover, assignment of meshes near the boundary of regions may be conducted in the manner that the mesh is decided to belong to the region where a ratio of the area allowing cross of rectangular shape of mesh and region becomes high.

In order to update the map data in region units under the management in mesh units, it is enough to update at a time the map data in mesh units to form a region. The map data in mesh units which is placed under the management corresponding to the predetermined region for conducting updating in region units becomes the partial updating data. However, update in region units using the partial updating data has a certain problem. When the region 01, for example, is updated, a contradiction is likely generated for the boundary to the region 02. Namely, since a road overlapping the boundary of regions is newly set and a new road is included in the newly updated mesh but not included in the adjacent meshes on the boundary because the region 01 has been updated, disconnection of a road is generated.

Accordingly, a mesh ID column which is likely generating a contradiction when updating is executed in region units as explained above is expressed as region boundary mesh ID column TL1031. This is formed of the update object region ID 10311, adjacent region ID 10312, and adjacent mesh ID column 10313. In the record 10310 indicated in this example, adjacent region ID:02 exist for the update object region ID:01 and there are {m11, m21, m31, m42, m53, and m54} as the adjacent mesh ID column when viewed from the region 01. That is, adjacent mesh in this specification means the adjacent mesh of the mesh located in the external side of the meshes under the management corresponding to the predetermined region and the mesh not under the management corresponding to such region. For example, in the case where the region 01 is updated with the partial updating data, it can be understood regarding the mesh ID column that revision is also required for the adjacent mesh for obtaining matching with the partial updating data.

The update management data memory 103 includes the partial update management data TL1032, differential update management data TL1033, and region boundary mesh ID column TL1031 explained above.

The partial update management data TL1032 includes the registered partial update management data as the data for management of partial updating data stored in the update-data memory 170. FIG. 4 schematically shows registered contents of the partial update management data TL1032. As shown in the figure, a record 10320 of the partial update management data includes a field 10321 for registering the partial update region ID as the identification information of the region indicated by the partial updating data, a field 10322 for registering time and date of updating of the partial updating data, and a field 10324 for registering path (memory address) for partial updating data.

Here, a structure of partial updating data file 1701 is shown in FIG. 7A. As explained above, the partial updating data is structured by the records collected as many as the number of meshes within the region and each of such records is formed of link map data related to the mesh ID 17011 and the link data column 170012 existing in such mesh.

Figures 5, 6:
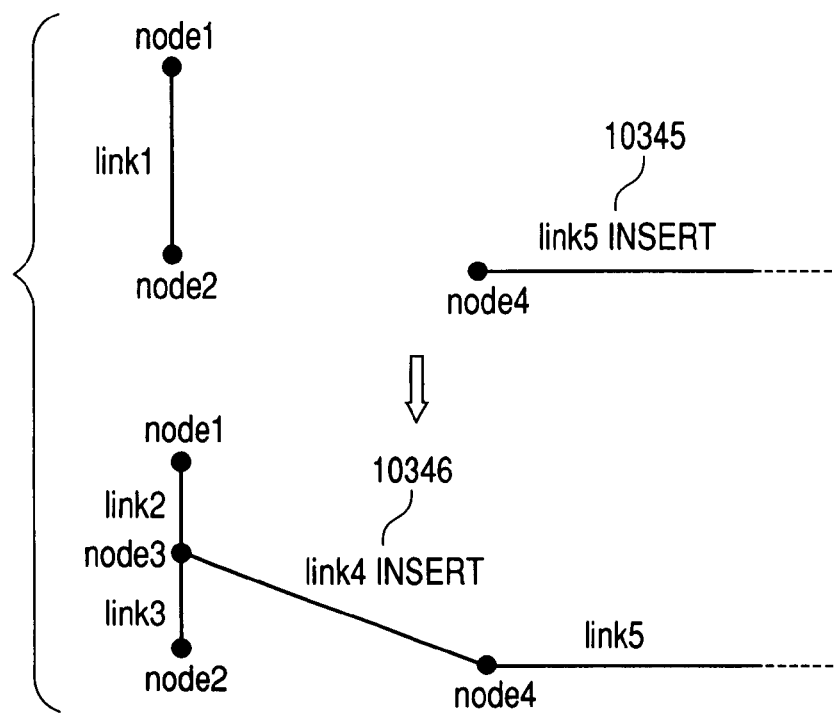
FIG. 5 is a schematic diagram showing registered contents of differential update management data TL 1033.
FIG. 6 is a diagram for explaining depending relationship of differential updating data.

The differential update management data as the data for management of the differential updating data stored in the update-data memory 170 is registered to the differential update management data TL1033. FIG. 5 schematically shows registered contents of the differential update management data TL1033. As shown in the figure, a record 10330 of the differential update management data includes a field 10331 for registering the differential updating data ID as the identification information of the differential updating data, a field 10332 for registering time and date of updating of the differential updating data, a field 10333 for registering map region (mesh ID column) where a map article indicated by the differential updating data, a field 10334 for registering dependent update data to be explained later, and a field 10335 for registering path (memory address) to the differential updating data. In some cases, update overlapping plural adjacent meshes is held with only one differential updating data. In this case, plural mesh IDs are stored in the field 10332. Moreover, there exist plural depending update data IDs to be stored in the field 10334 in some cases.

Moreover, the depending update data ID is the other differential updating data giving influence on the connecting relationship of map article and is also the differential updating data ID of differential updating data updated before the time and date of update. FIG. 6 is a diagram for explaining depending relationship of the differential updating data. As shown in this figure, it is assumed that the differential updating data A where the node 4 adds a straight road formed of the link 1 and non-connected link 5 is generated (10345) and thereafter the differential updating data B is generated (10346) for changing the straight road formed of the link 1 into the road in the shape of T formed of the link 2, link 3 and link 4. Here, when one of the link 4 is the node 4, the straight road formed of the link 5 is connected to the road in the shape of T added subsequently. Namely, the differential updating data A gives influence on the connecting relationship of the map article indicated by the differential updating data B. In this case, the differential updating data ID of the differential updating data A becomes the depending update data ID of the differential updating data B.

Here, a structure of the differential updating data file 1702 is shown in FIG. 7B. The differential updating data is formed of one or more link update data. A link update data is formed, as indicated in the record 17020, of an update type 17021, a link ID 17022, a height flag 17023, a width 17024, a type flag 17025, a point data 17026, a start node 17027, and an end node 17028. Here, each attribute of the link update data is different in existence or non-existence of a value of each attribute in accordance with a value of the update type 17021. For example, when the update type 17021 is inserted, a value is held in all attributes. On the other hand, when the update type 17021 is delete, only the link ID is held, and when the update type 17021 is update, only the link ID and the changed 14 attribute are held. Addition, deletion, and correction of link are conducted to the map data of the navigation terminal 20 in accordance with these update types.

Returning to FIG. 1, the communication IF 150 executes the update process of map data of the navigation terminal 20 via the communication IF 250 of the navigation terminal 20 through the network 40.

The updating region indicator 110 indicates the region as the object of update process to the navigation terminal 20. Here, indication by a user or region ID determined as the initial value when the navigation system is delivered is indicated.

The updating management data generator 120 obtains time and date of updating of the indicated region in the navigation terminal 20 from the update management data memory 203 and moreover the mesh ID located at the boundary between the indicated region and the adjacent region from the update management data memory 103. In addition, the updating management data generator 120 also obtains the differential updating data ID which is already applied in the navigation terminal 20 from the update management data memory 203.

The update-data selector 130 collects the differential updating data in regard to the boundary of regions of the partial updating data indicated by the region ID designated with the updating region indicator 110 and eliminates the differential updating data ID already applied to the navigation terminal 20 from the collected differential updating data in view of selecting the differential updating data as the update object.

The map updater 140 executes update process to the navigation terminal 20 using the differential updating data and partial updating data which have been determined as a result of selecting process of update data explained above.

Figure 8:
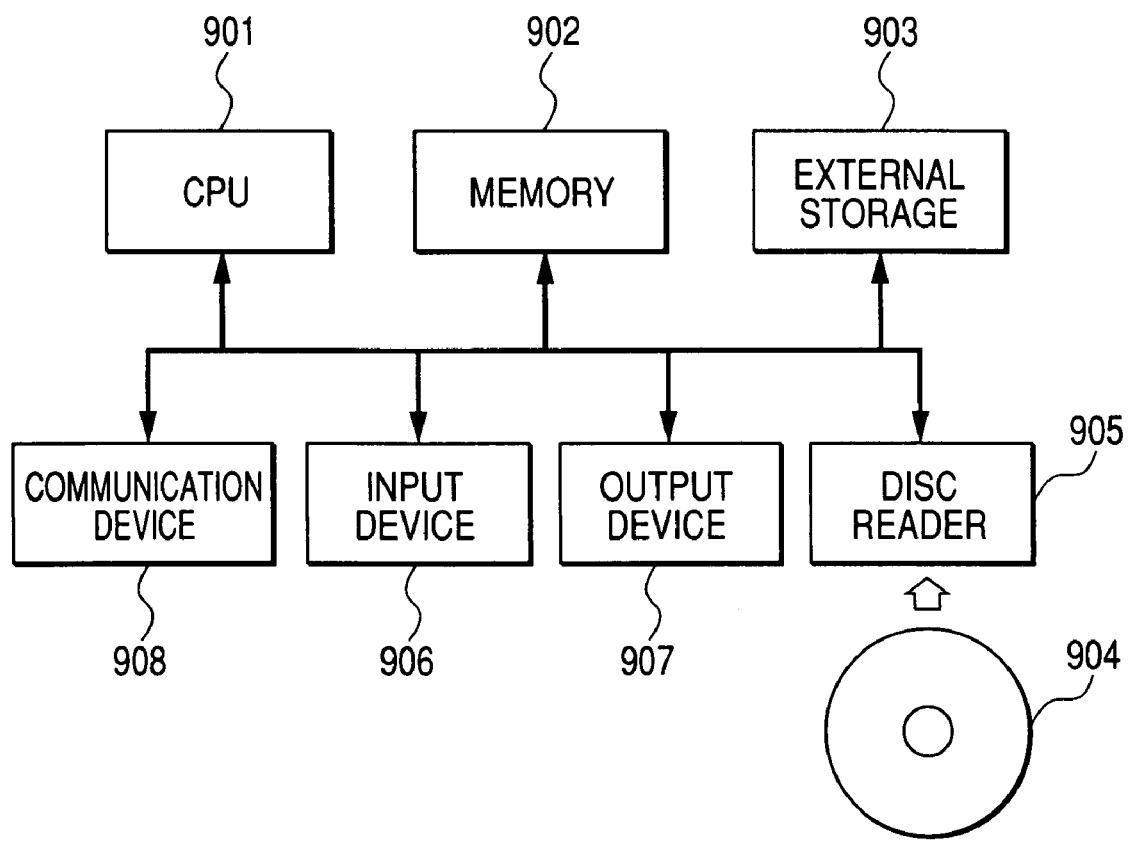
FIG. 8 is a diagram showing an example of hardware structure of a map provider 10 and a navigation terminal 20.

The map provider 10 explained above can be realized when a CPU 901 executes the predetermined program loaded on a memory 902 in a computer system comprising, for example as shown in FIG. 8, the CPU 901, the memory 902, an external storage 903 such as HDD or the like, a disc reader 905 for reading information from a portable memory medium 904 such as CD-ROM and DVD-ROM, an input device 906 such as keyboard and mouse, an output device 907 such as display, and a communication device 908 for connection to the communication network. It is also possible that this predetermined program may be downloaded to the external storage 903 from the memory medium 904 via the disc reader or from the network via the communication device 908 and may also be executed by the CPU 901 through the loading on the memory 902. Moreover, it is also possible that such program may be downloaded in direct to the memory 902 from the memory medium 904 via the disc reader 905 or from the network through the communication device 908 and thereafter the program is executed by the CPU 901. In this case, the memory 902, external storage 903 and memory medium 904 are used as the update-data memory 102 and update management data memory 103.

Returning again to FIG. 1, the navigation terminal 20 executes the navigation process such as map display, route search, and route guidance, etc. using the map data stored therein.

As shown in the figure, the navigation terminal 20 includes the network IF 250 for connecting the navigation terminal 20 to the network 40, update management data memory 203, map data memory 270, navigator 280, and GUI (Graphical User Interface) 209 for displaying information to users and accepting indication from users.

The update management data memory 203 includes partial update management data TL 2032 and differential update management data TL 2033.

The partial update management data of the partial updating data applied to the map stored in the map data memory 206 is registered to the partial update management data TL 2032. FIG. 10 is a schematic diagram showing registered contents of the partial update management data TL 2032. As shown in this figure, a record 20320 of the partial update management data includes a field 30321 for registering the partial update region ID as the identification information of the region indicated by the partial updating data and a field 20322 for registering time and date of updating of the partial updating data. Only a record 20320 of the partial update management data for management of the latest time and date of update applied to the map data is registered to the partial update management data TL 2032 in every object region.

The differential update management data of the differential updating data applied to the map data stored in the map data memory 270 is registered to the differential update management data TL 2033. FIG. 11 is a schematic diagram showing registered contents of the differential update management data TL 2033. As shown in this figure, a record 20330 of the differential update management data includes a field 20331 for registering the differential updating data ID as the identification information of the differential updating data, a field 20332 for registering time and date of updating of the differential updating data, a field 20333 for registering existing region (mesh ID column) of map article indicated by the differential updating data, and a field 20334 for registering the depending update data ID explained above.

Figure 9:
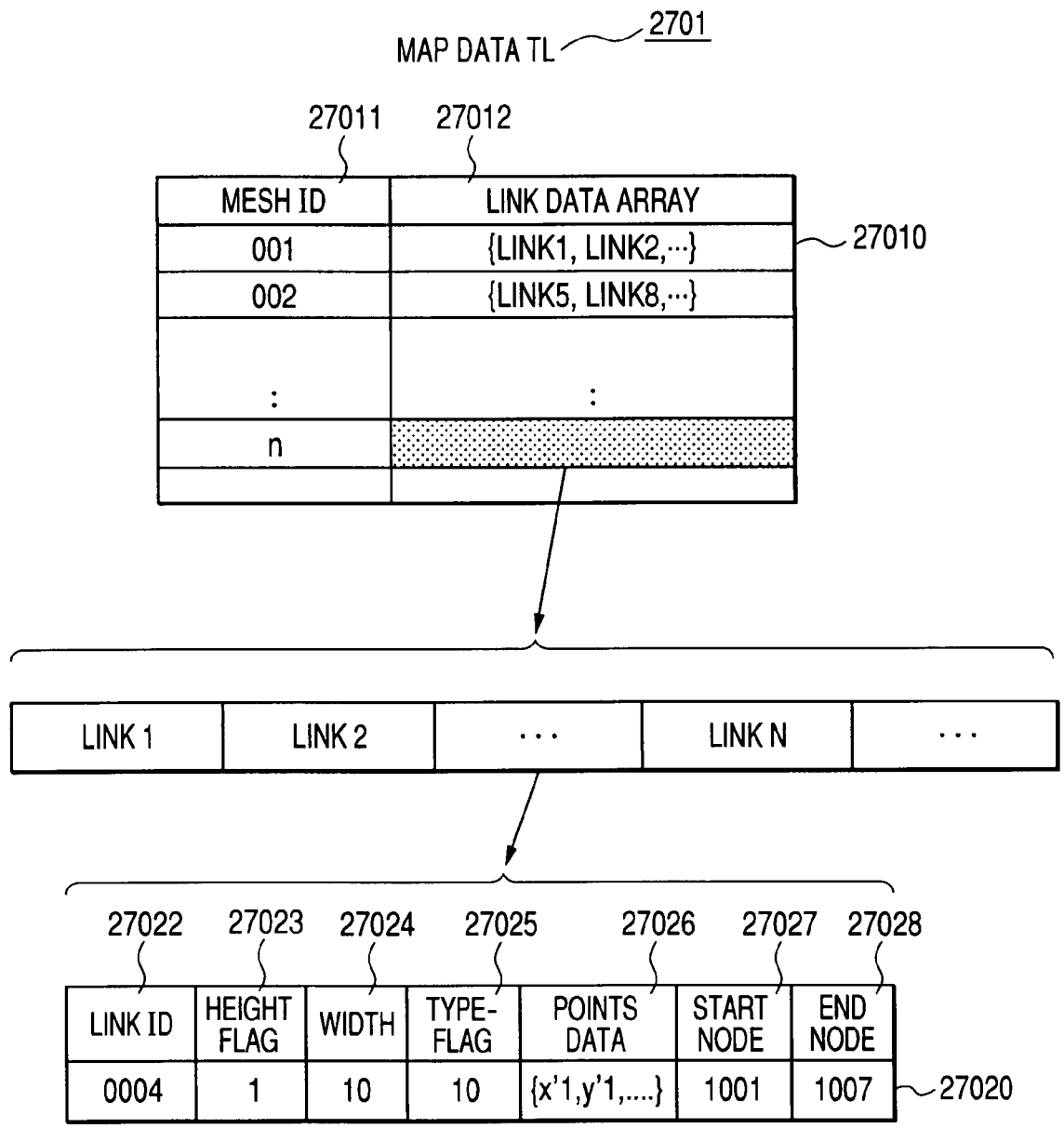
FIG. 9 is a schematic diagram showing registered contents of map data TL 2701.

FIG. 9 is a schematic diagram showing registered contents of map data under the management in the map data memory 270. As shown in this figure, a record 27010 of the map data TL 2701 includes a field 27011 for registering the mesh ID and a field 27012 for registering a link data column indicating the roads existing in the mesh region. Moreover, plural links are stored in arrangement as shown in the figure in the link data columns registered to the link data columns. A record 27020 of this link includes a link ID 27022 for identifying the link, a height flag 27023, a width 27024, a type flag 27025 indicating type of road of link such as ordinary road and toll road, a point data 27026 as the coordinate data of points (points formed of start node, end node and intermediate node existing at the curving point of link) showing a shape of link, a start point node 27027 given to the start node of link, and end node 27028 given to the end node of link.

The navigator 280 executes navigation processes such as map display, route search and route guidance using the link data registered to the map data TL 2701.

The navigation terminal 20 can be realized when the CPU 901 executes the predetermined program loaded on the memory 902 in a computer system of the structure where a GPS receiver and/or various sensors such as a bearing sensor and a velocity sensor and an I/O device for transmitting and receiving information are provided to the structure, for example, shown in FIG. 8. This predetermined program may be downloaded to the external storage 903 from the storage medium 904 via the disc reader 905 or from the network via the communication device 908 and this program may also be executed with the CPU 901 after it has been loaded to the memory 902. In this case, the memory 902 and external storage 903 are used as the update management data memory 203 and map data memory 270.

Figure 12:
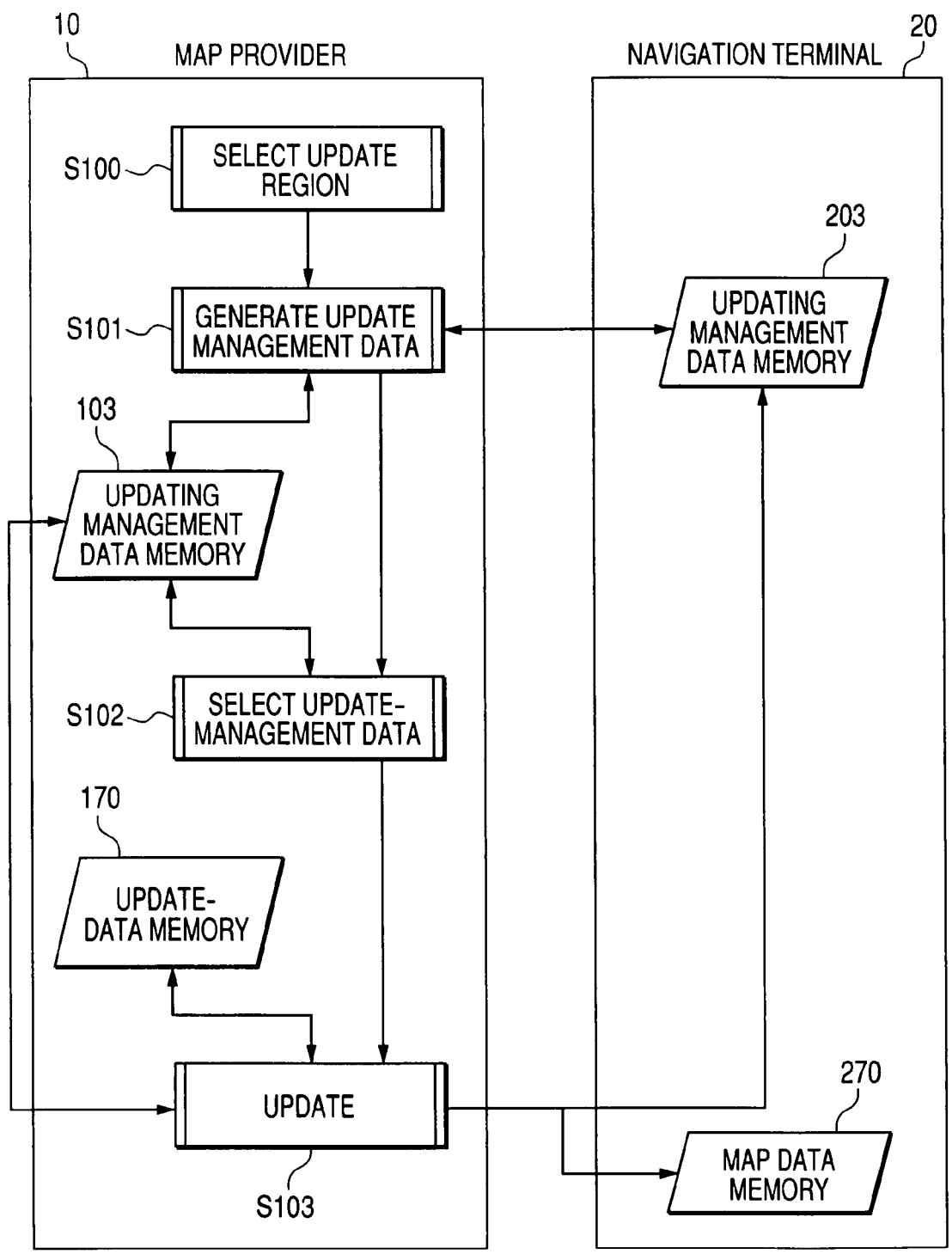
FIG. 12 is a diagram for explaining total operations of the map data update system to which an embodiment of the present invention is applied.

FIG. 12 is a diagram for explaining total operations of a map data distribution system to which an embodiment of the present invention is applied. In this embodiment, the navigation terminal 20 is connected to the map provider 10 using, for example, a USB cable and a LAN cable to execute the update process of map information stored in the navigation terminal 20 through user operations. Particularly, when connection is made using the USB cable, data can be written in direct to a storage such as HDD provided in the navigation terminal 20 from the map provider 10. Here, the partial updating data and differential updating data for update stored in the map provider should be periodically supplied from a map contents providing center or the like provided in separation via the network or a portable storage media or the like.

In the map provider 10, the updating region indicator 110 indicates (S100) for indicating the update object from a user via the GUI 109 and the update management data memory 120 obtains time and date of update in the region indicated by S100 by referring to the partial update management data TL 2032 under the management of the update management data memory 203 of the navigation terminal 20 via the communication IF 150. Next, in order to revise the boundary with the adjacent regions at the time of updating the indicated region, the mesh ID adjacent to the boundary of the indicated region by referring to the region boundary mesh ID TL 1031 under the management of the update management data memory 103. Finally, the differential updating data ID which has already been applied can be obtained by referring to the differential update management data TL 2033 from the update management data memory 203 of the navigation terminal 20 via the communication IF 150 (S101).

Subsequently, the update-data selector 130 searches the differential update management data TL 1033 under the management of the update management data memory 103 on the basis of the mesh ID of the region boundary obtained from the updating management data generator 120 and obtains the necessary differential updating data ID. Thereafter, the depending update data ID to be applied previously is obtained for application of the differential updating data ID. Finally, a list of the not applied differential updating data IDs is obtained by eliminating the applied differential updating data ID obtained in the S101 from the differential updating data ID to be applied (S102).

Subsequently, the map updater 140 obtains a path for the partial updating data of the region as the update object determined in the S100 by referring to the update management data memory 103. In the same manner, the path for differential updating data determined in each step is obtained. Next, the update data to be applied is obtained from the update-data memory 170 on the basis of the path obtained in the above step, the differential updating data and partial updating data are applied to the map data TL 2701 under the management of the map data memory 270 of the navigation terminal 20 via the communication IF 150, and result of application is registered to the partial update management data tL 2032 and the differential update management data TL 2033 under the management of the update management data memory 203 (S103).

Figure 13:
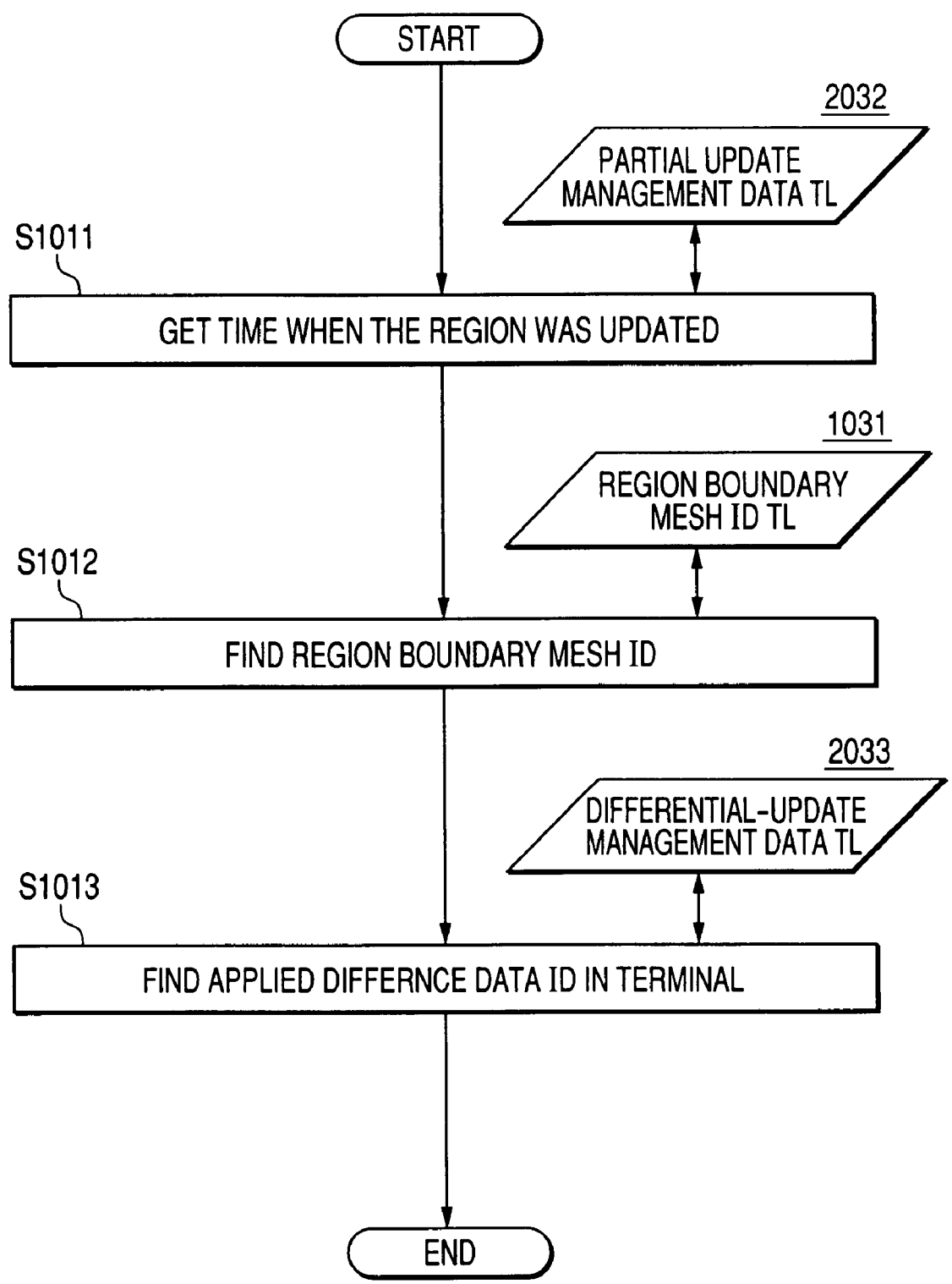
FIG. 13 is a diagram for explaining operation flow in the step S101 (update management data generating process) in FIG. 12.

FIG. 13 is a diagram for explaining detail operations of the step S101. First, a record 20320 of the partial update management data where the region ID corresponding to the region ID designated in the step S100 is registered to the field 20321 is got from the partial update management data TL 2032 to obtain time and date of updating of the map data in the designated region in the navigation terminal 20 (S1011). This time and date of update are used for the process shown in FIG. 15 which will be explained later.

Subsequently, a record 10310 of the region boundary mesh ID column where the region ID corresponding to the region ID designated in the step S100 is registered to the field 10311 is got from the region boundary mesh ID column TL 1031 in order to obtain a list of the mesh IDs of the update region boundary (S1012).

Finally, a record 20330 of the differential update management data where any of the mesh IDs stored in the adjacent mesh ID column held by the record 10310 of the region boundary mesh ID column is registered to the field 20333 is got from the differential update management data TL 2033. Moreover, in regard to each record 20330 of the differential update management data obtained, the record 20330 of the differential update management data where the depending update data ID included in the field 20334 of the record 20330 is extracted from the differential update management data TL 1033. This process is repeated until the record 20330 of the differential update management record including the depending update data ID is eliminated from the extracted field 20334 for each depending update data ID. Accordingly, the differential updating data ID which is already applied in the adjacent mesh as the object can be obtained in the navigation terminal 20 (S1013).

Figure 14:
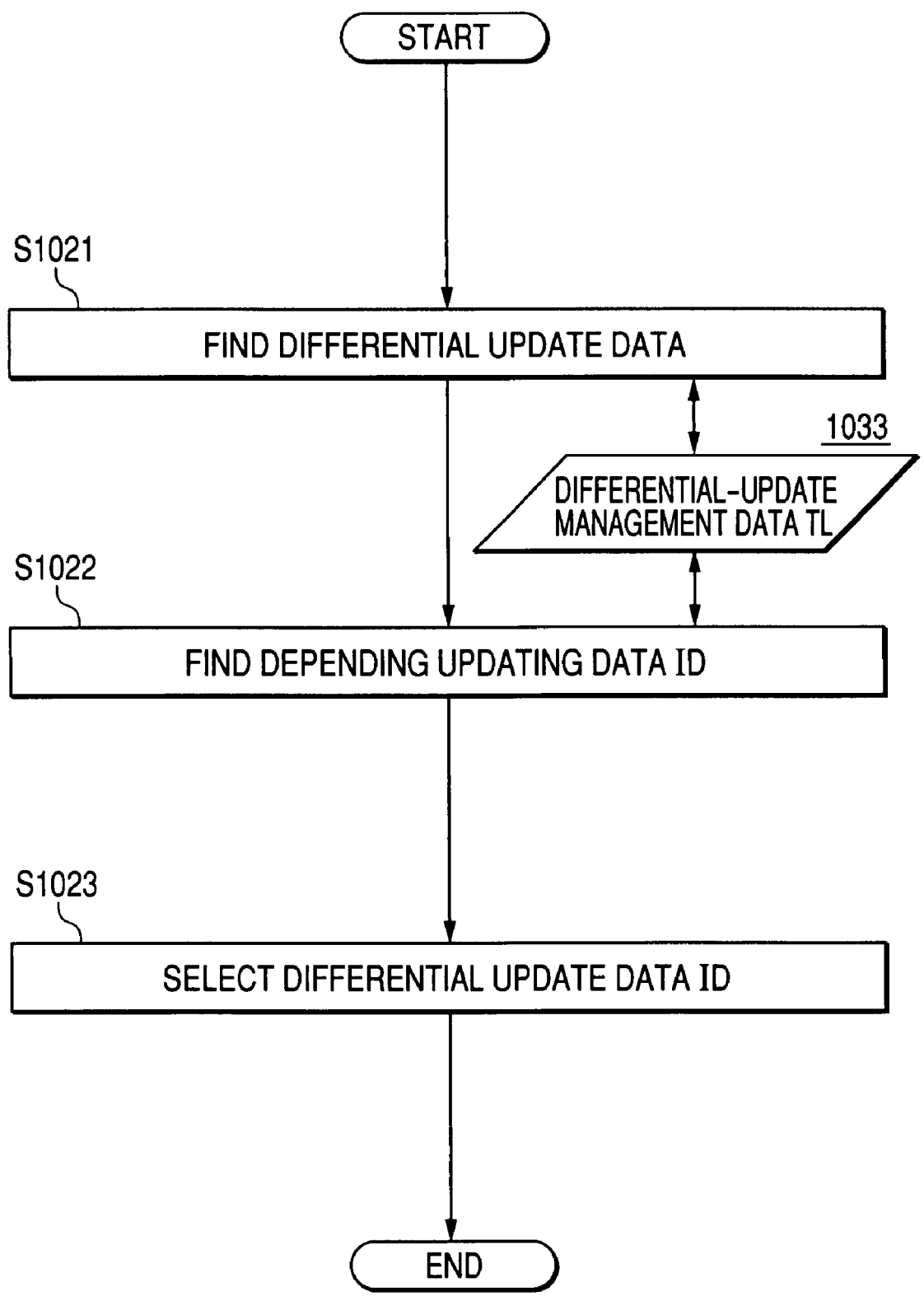
FIG. 14 is a diagram for explaining operation flow in the step S102 (update management data selecting process) in FIG. 12.

FIG. 14 is a diagram for explaining detail operations in the step S102. Here, the differential updating data as the update object is selected. First, a record 10330 of the differential update management data where any of the update region boundary mesh ID obtained in the step S1012 is registered to the field 10333 is extracted from the differential update management data TL 1033 (S1021). Thereby, the update data of structures updated can be obtained in the adjacent mesh as the object.

Subsequently, in regard to the record 10330 of the differential update management data extracted, the record 10330 of the differential update management data where the depending update data ID included in the field 10334 of the relevant record 10330 is registered to the field 10331 as the differential updating data ID is extracted from the differential update management data TL 1033. This process should be repeated for each of the record 10330 of the differential update management data extracted until the depending update data ID is eliminated from the field 10334 of the record 10330 of the differential update management data. Accordingly, the differential data of the feature affected by updating of the adjacent mesh can be obtained even in the adjacent mesh other than that as the object (S1021). With the processes explained above, candidates of the differential updating data ID to be updated to the navigation terminal 20 can be obtained.

Finally, the differential updating data ID not yet applied can be determined in the navigation terminal 20 by eliminating the list of the differential updating data ID obtained in the step S1013 (S1023).

The latest state without any contradiction can be attained between the region as the update object in regard to the boundary of region and the region not as the update object and any discontinuity of road is never generated among the meshes by sequentially applying, from the older data, the differential updating data having the depending relationship as the update object determined as explained.

It is also effective to attain, in addition to the process explained above, the designated region and the time and date of updating of the adjacent region in the step S1011 and previously eliminate the differential updating data ID older than the time and date of the preceding update at the time of obtaining the differential updating data in the step S1021.

In addition, the update object between the designated region and the adjacent region can be selected to the roads ranked higher than the designated roads by further providing type designation of roads at the time of obtaining the differential updating data ID in the step S1021 and then obtaining only the differential updating data ID for update in regard to the roads ranked higher than the designated roads among the differential updating data. For example, it is also possible to set only the Freeway among those overlapping the boundaries of prefectures as the update object by applying the present invention under the condition that prefectures in Japan are designated as the update regions. Therefore, the time required for update process can be reduced by setting narrower roads and ordinary roads which are assumed to have lower usage frequency as the roads other than the update object.

Figure 15:
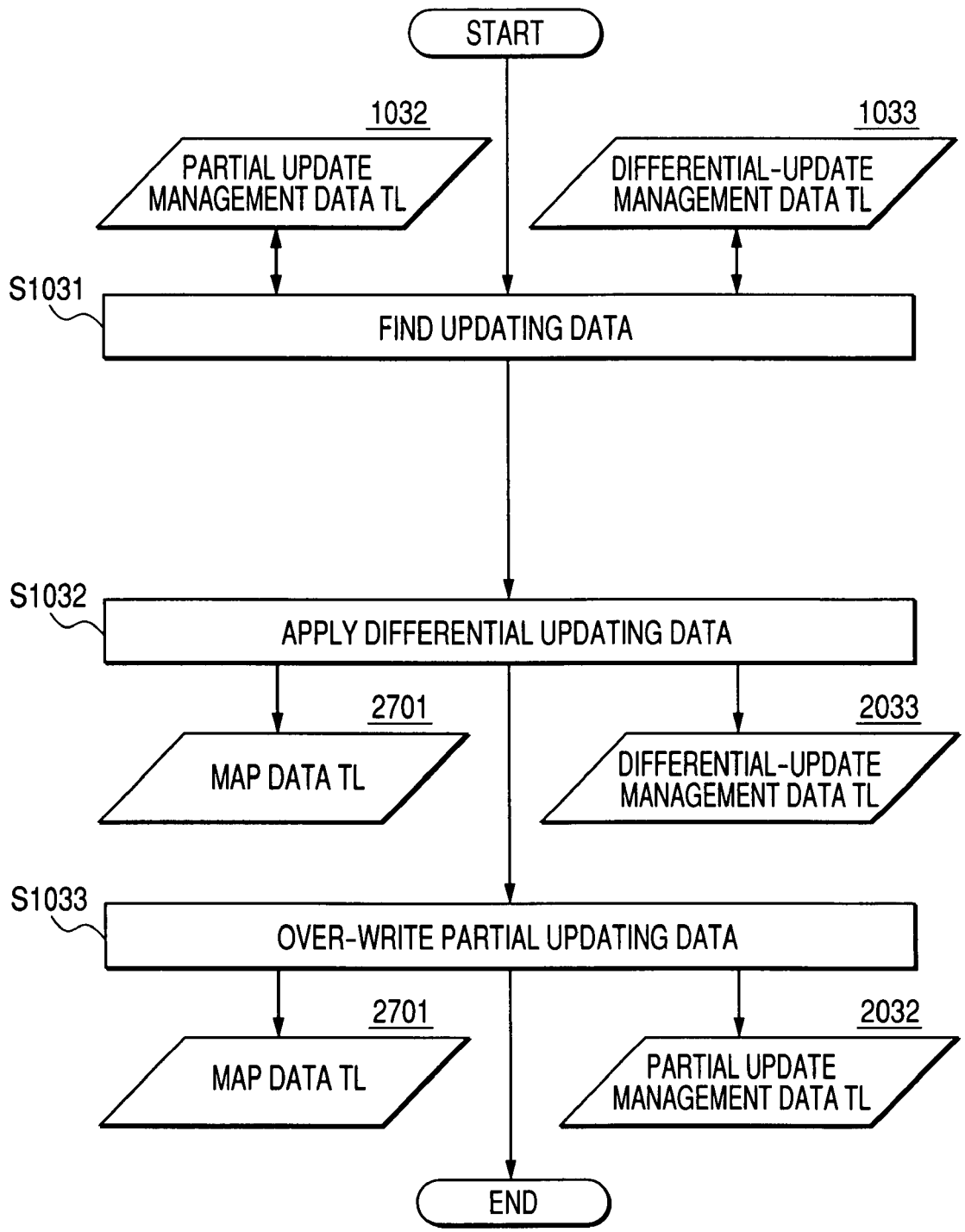
FIG. 15 is a diagram for explaining operation flow in the step S103 (update application process) in FIG. 12.

FIG. 15 is a diagram for explaining detail operations in the step S103. Here, the update data already selected is applied to the map data memory 270 of the navigation terminal 20. First, a record 10320 of the partial update management data where the region ID of the update object is registered to the field 10321 and the time and date of update after the same data obtained in the step S1011 are registered to the field 10322 is obtained from the partial update management data TL 1032. Moreover, a record 10330 of the differential update management data where any of the differential updating data ID obtained in the step S1023 is registered to the field 10331 is searched from the differential update management data TL 1033. Both partial updating data file and differential updating data file under the management of the update-data memory 170 are obtained by referring to the path for each update data file of the record obtained by the search explained above. Thereby, the partial updating data and the differential updating data can be obtained as the update object (S1031).

Subsequently, each differential updating data file obtained in the step S1031 is applied sequentially to the map data TL 2701 from the older time and date of update stored in the record of the differential update management data. A record 27010 of the map data registering the mesh ID written in the mesh ID column stored in the record of the differential update management data to the field 27011 is searched from the map data TL 2701 and a record 27020 of the link data matching with the link ID 17023 written in the link update data 1702 in the differential updating data is searched from the link data column stored in the field 27012. Thereafter, the record 27010 is deleted in accordance with the value of update type in the 17022, namely when such value is deleted. When such value is update, each attribute value is applied. When the value is inserted, such record is added to the link data column as the record of a new link data. After the differential update processes explained above are all conducted for the differential updating data, the differential updating data ID is registered to the differential update management data TL 2033 (S1032).

Finally, application process for replacing the record matching in the mesh ID to the map data TL 2701 is executed for the partial updating data obtained in the step S1031. Subsequently, the time and date of updating of the record 20320 matching in the partial update region ID is applied for the partial update management data TL 2032 (S1033).

As explained above, in this embodiment, after execution of application of the differential updating data written in the step S1032, the partial updating data written in the step S1033 is sequentially executed. On the contrary, if the differential updating data is applied after application of the partial updating data, the differential updating data is applied after overwriting of the partial updating data to the meshes near the boundary within the designated regions and thereby contradiction due to the double writing is likely generated. Therefore, the sequential applications of the partial updating data after the differential updating data will results in a merit that matching may be maintained only with the simplified process.

When the differential update process to the meshes belonging to the update object region is preliminarily eliminated in order to avoid the process overlapping to the update process using the differential updating data written in the step S1032 and the update process using the partial updating data written in the step S1033, the same update result can be obtained even when any process of the steps S1032 and S1033 is executed previously. Accordingly, there is no restriction in the execution sequence.

The latest state of the map data of the designated region can be attained by such application process of the partial updating data. Moreover, contradiction among the boundaries has also been eliminated with the update process for the adjacent boundary shown in FIG. 14. In addition, the application process of this partial updating data is conducted as the overwriting of file in the case of introducing the mounting means for dividing, for example, the map data into the physical data files for each region and then storing such map data into a storage device such as a hard disc. Accordingly, such application process can be done in very higher rate.

In the present specification as explained above, updating in road units at the boundary of update region based on the differential updating data is combined with the updating of the entire part of the designated region based on the partial updating data. If the update process is executed in mesh units also for the boundary of update region, contradiction is generated in connection of new roads when new roads exist in the boundary in the opposite side of the update region among the boundaries of the adjacent meshes. Therefore, in this case, the external meshes are considered as the update object. In some cases, spread of updating of mesh cannot be stopped in order to eliminate contradiction in the boundary by conducting update in mesh units as explained above. Or, when the scope of updating is restricted in the course of process, discontinuity of road is likely generated at the boundary of mesh.

Meanwhile, in the case of update based on the differential updating data, the road newly arranged at the boundary of the designated region and the adjacent region and moreover the road in the depending relationship with such road, namely only the roads required for connection with the existing roads at the external side of the designated region are considered as the update objects and these roads can be added for the minimum update required for connection of roads. Such difference will make it possible for users to expect that the time required for update process can be reduced by limiting the update object. Moreover, since connections of roads are maintained, connections of roads to the external side from the designated region can also be maintained as well as the roads within the designated region and moreover the navigation process such as route search functions normally.

It is also possible to execute all update processes using the differential updating data in place of executing the update process through combination of the partial updating data and differential updating data as explained above. However, the update process in region units where update object is set to a comparatively wider range cannot be considered as an actual update process from the viewpoint of the processing time because the update process in which a link is read, corrected, and written in units of the elements is repeated for a numerous number of times.

Therefore, in the structure of this specification, since a large number of data must be updated for the mesh forming a region when such region is designated, updating is executed by overwriting the data using the partial updating data. On the other hand, a part affected further by the adjacent mesh, particularly the minimum data required for elimination of contradiction on the map based on the time and date of updating of the map data to be applied is updated in units of the features. Therefore, reduction of time required for writing to the memory, reduction in amount of data, and simplified management of data can be realized completely.

A preferred embodiment of the present invention has been explained above but the present invention is never restricted by the embodiment explained above and allows various modifications within the scope of the subject matter.

For example, the similar map update process can also be realized by arranging each processor provided in the map provider 10 of FIG. 1 in the navigation terminal 20, and newly providing a media reader 280 to read the necessary information from a map data medium 30 recording the update management data 303 and update data 370. In this case, a user can effectively update the predetermined region without any contradiction quickly only by using the map data medium corresponding to a portable storage media such as DVD and USB memory without connection to the map provider 10. Moreover, since new map data can be stored into the map data medium, it is also possible to additionally provide a device such as a PC, periodically obtain the new map information from the map providing center via the network connected to the same device and to write the map information to the map data medium. Accordingly, it is also possible to get a merit that a user can obtain a new map in the desired timing.

Figure 16:
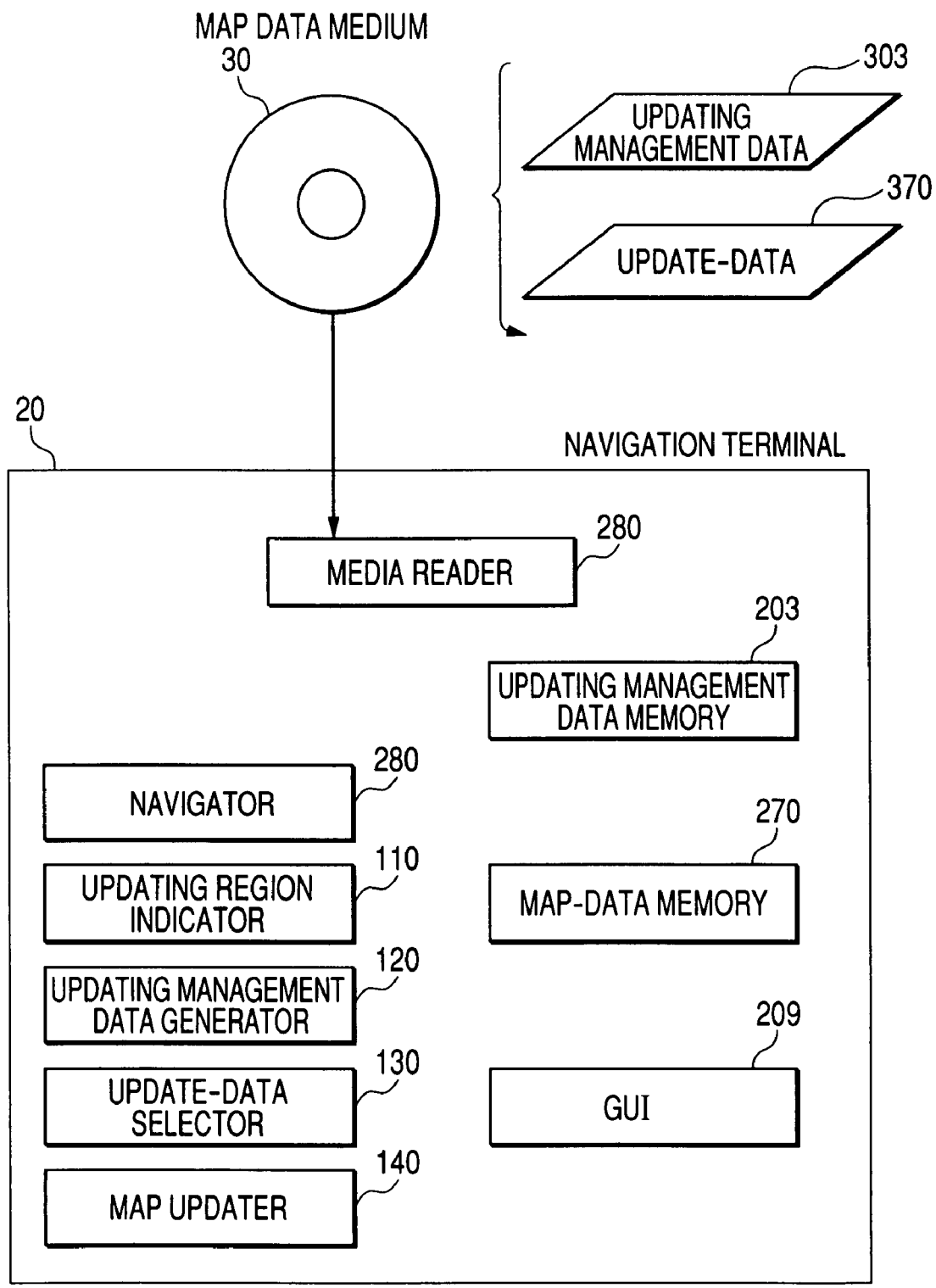
FIG. 16 is a schematic diagram showing a navigation terminal to which an embodiment of the present invention is applied.
Figure 17:
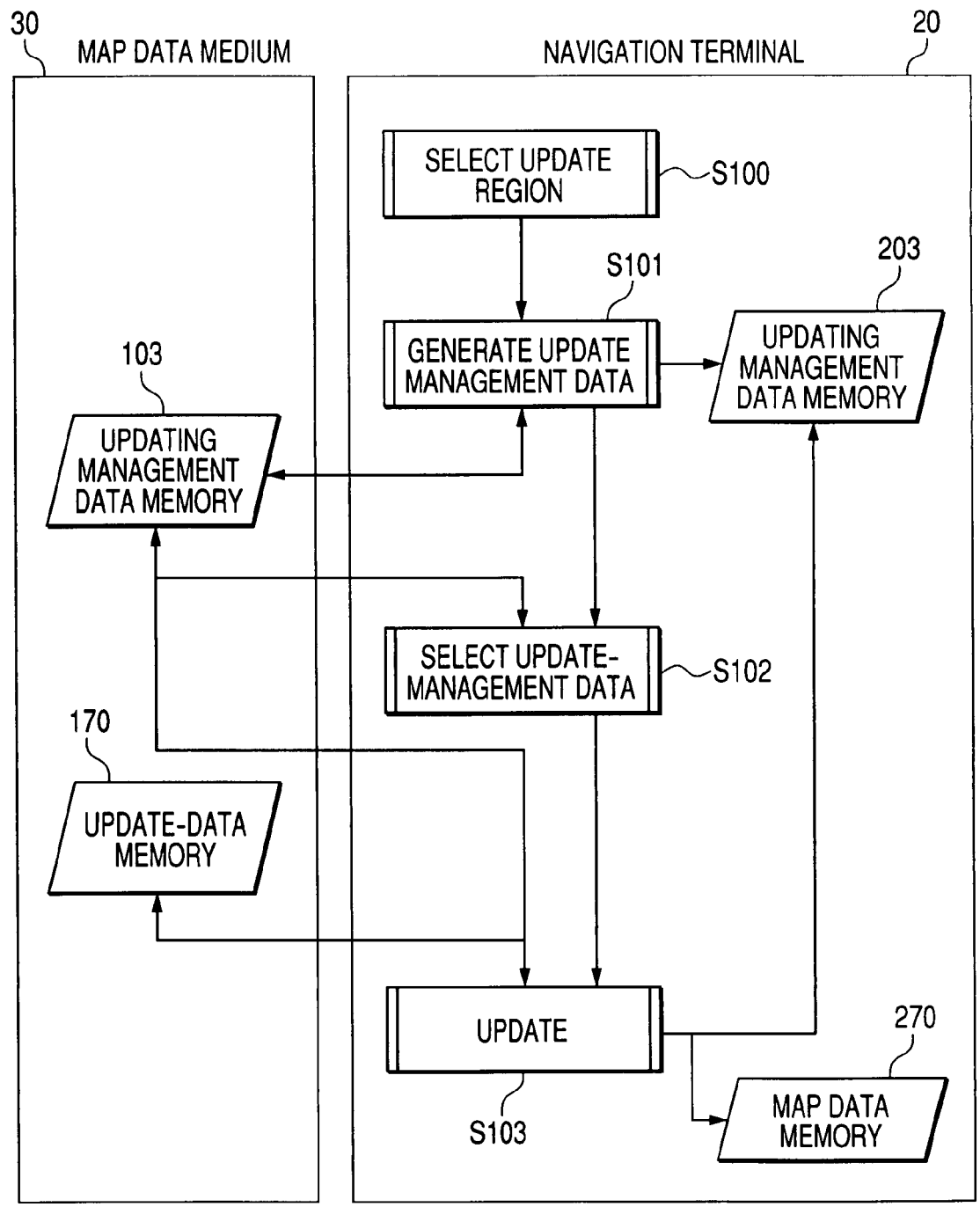
FIG. 17 is a diagram for explaining total operations of the map data updating process to which an embodiment of the present invention is applied.

FIG. 17 shows flow of processes when the structure of FIG. 16 is introduced. In comparison with FIG. 12, differences may be found in the points that the processes up to the step S103 from the step S100 are executed in the navigation terminal 20 and that reference is made to the update management data 303 and update data 370 via the data reader 280 because of above difference. However, the processing contents are identical.

Figure 19:
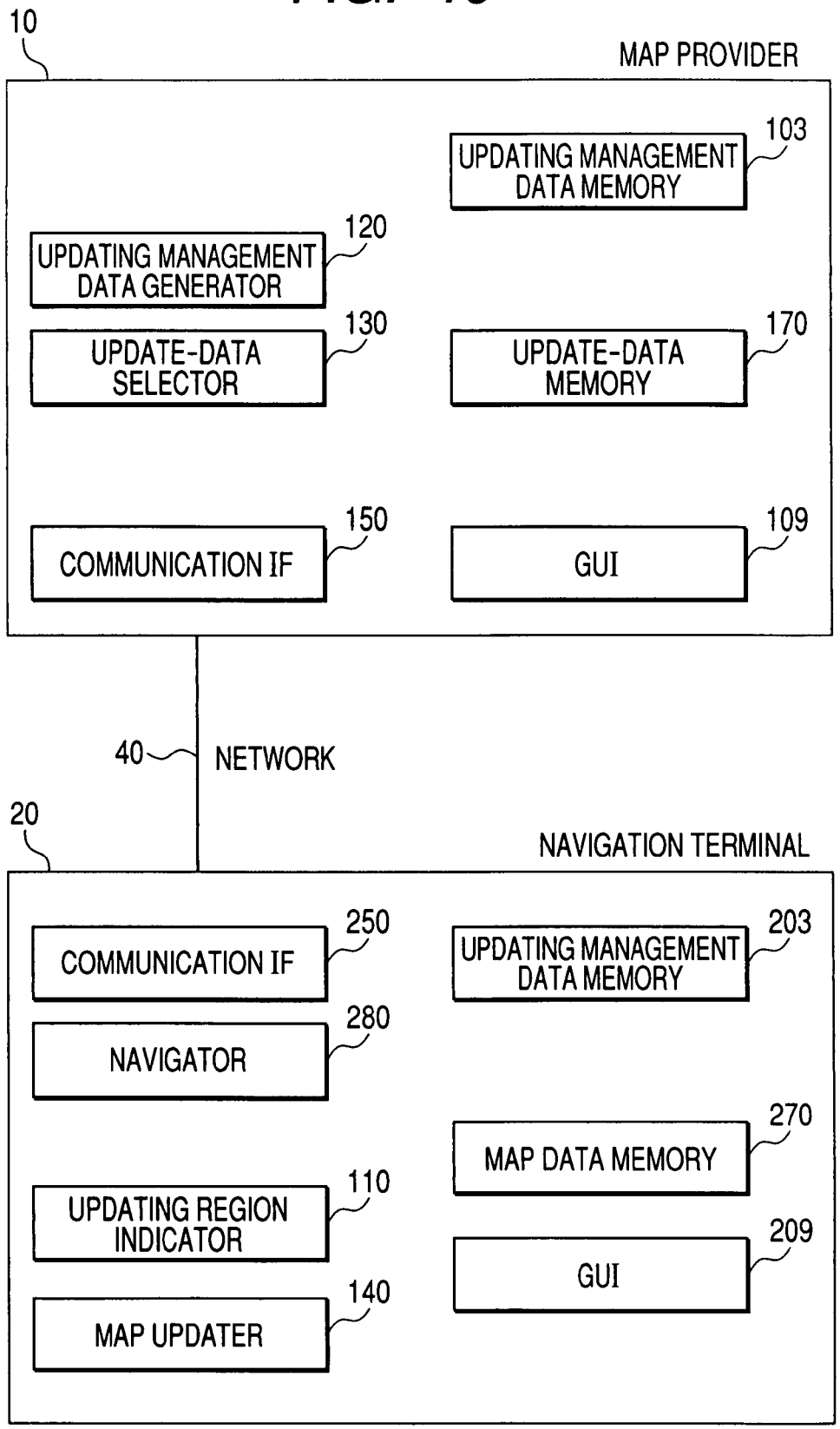
FIG. 19 is a schematic diagram showing a navigation terminal to which an embodiment of the present invention is applied.

Or, as shown in FIG. 19, it is also possible to arrange the updating region indicator 110 and map updater 140 among the units provided in the map provider 10 in FIG. 1 within the navigation terminal 20. In this case, differences are that region indication is conducted by a user via the GUI 209 of the navigation terminal 20 and that the process (FIG. 15) for applying the update data obtained from the map provider 10 to the update management data memory 203 and map data memory 270 is executed in the navigation terminal 20. However, search of data for updating in the step S1031 among the processes shown in FIG. 15 may also be executed with the map provider 10. In this example, the map provider 10 is not required to be adjacent to the navigation terminal 20. For example, this map provider 10 may be installed at the remote region connected, for example, through a portable phone and the network 40 of LAN, resulting in the merit that the update data can be obtained through the communication and restriction of place for update process applied on users can also be eliminated.

Moreover, in the embodiment explained above, distribution object is considered as the update data of link forming the road. However, the present invention is not limited thereto. Namely, update data of link forming a railway and update data of the map element other than the link data may also be considered as the distribution object.

In addition, it is also possible in the embodiment explained above to update the map data memory 206 by eliminating, for example, the navigator 207 from the navigation terminal 20 and connecting a terminal which can unload the map data memory 206 to the network 40. It is additionally possible to remove the map data memory 206 from the terminal and then load this memory to the navigator prepared separately.

What is claimed is:

1. A map data updating terminal, comprising:

an input unit for accepting an indication to set an update region for a set of map data having predetermined regions, the set of map data being stored in a recording unit and used by a route guide processing unit;

a communication unit for obtaining preset information for the update region and transmitting map updating data and differential updating data; and an update processing unit for updating said set of map data based on the map updating data and the differential updating data obtained via said communication unit, wherein said communication unit is adapted to obtain the map updating data for predetermined region units being managed under said update region, first differential updating data for a first map structure, and second differential data for a second map structure, the first and second map structures respectively being in a first predetermined region unit and a second predetermined region unit, the first predetermined region unit being adjacent to said update region, the first and second predetermined region units being managed under predetermined regions of the set of map data that are different than the update region, the first differential updating data corresponding to said update region, the second differential updating data having a dependent relationship with the first differential updating data, and wherein said update processing unit is adapted to conduct updating of said set of map data through said communication unit using said map updating data for said predetermined region units being managed under said update region and the first and second differential updating data for the first and second map structures in the first and second predetermined region units respectively.

2. The map data updating terminal according to claim 1, wherein said update processing unit is adapted to conduct updating by overwriting said map updating data for said predetermined region units being managed under the update region over the set of map data stored in the recording unit.

3. The map data updating terminal according to claim 1, wherein said update processing unit is adapted to update said set of map data for said update region by conducting updating using said map updating data for said predetermined region units after updating said set of map data for said first and second structures using said first and second differential updating data.

4. The map data updating terminal according to claim 1, wherein said update processing unit is adapted to update said set of map data for said update region using said differential updating data after eliminating, from said differential updating data, any differential updating data for map data located in said predetermined region units being managed under the update region.

5. The map data updating terminal of claim 1, further comprising:

an updating data extracting unit for searching, from a map database of data for conducting management of the set of map data in predetermined region units, the map updating data for the predetermined region units being managed under said update region and the first and second differential updating data for the first and second map structures in the first and second predetermined region units respectively.

* * * * *